L. GOODYEAR.

Door-Checks.

No. 5,902. Reissued June 2, 1874.

*Witnesses:*

Edw. W. Donn

John M. Adriaans Jr.

*Inventor:* for Lewis Goodyear by F. E. W. Crocker

Attorney

AM. PHOTO-LITHOGRAPHIC Co. N. Y. (OSBORNE'S PROCESS.)

UNITED STATES PATENT OFFICE.

LEWIS GOODYEAR, OF TRUMANSBURG, NEW YORK.

IMPROVEMENT IN DOOR-CHECKS.

Specification forming part of Letters Patent No. 141,425, dated August 5, 1873; reissue No. 5,902, dated June 2, 1874; application filed May 22, 1874.

DIVISION C.

*To all whom it may concern:*

Be it known that I, LEWIS GOODYEAR, of Trumansburg, in the county of Tompkins and State of New York, have invented a new and useful Improvement in Door-Checks, providing a simple and easy method of preventing the slamming of doors, by an economical device, which may be readily attached, and will not be liable to get out of order.

My invention consists in the combination of a latch or lever with an arm to guide its movements as the door is closing, and the necessary springs to actuate the parts.

Figure 1:
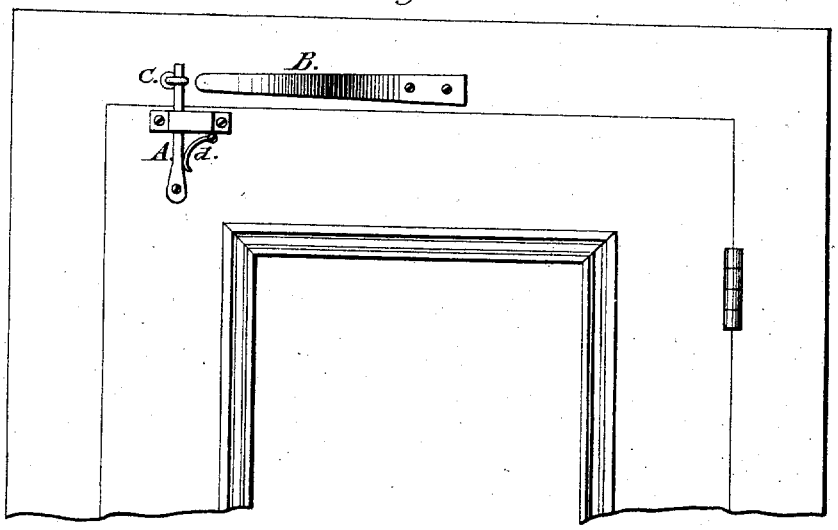
Figure 2:
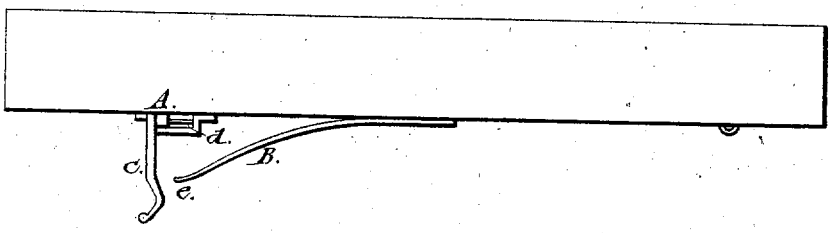
Figure 3:
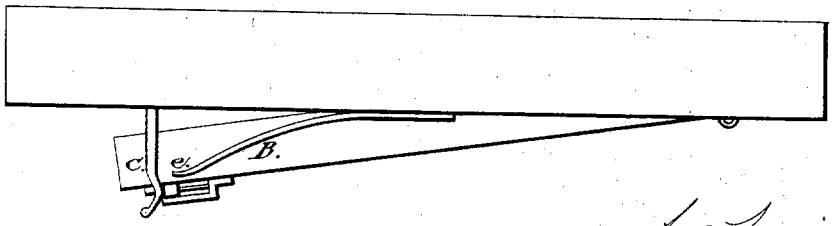

The device by which I accomplish my object is more completely shown in the drawings, Figure 1 showing it when attached to the top of a door, with the latch in a perpendicular position; Fig. 2 being a plan view of the same, the door being closed; and Fig. 3 the same with the door partly open or not quite shut.

A is the latch; B, the principal or main spring; C, the arm or guide, and *d* the small spring regulating the movement of the latch.

The door-check may be placed at the side instead of the top of the door, in which case the spring *d* may be dispensed with. The spring B is curved, as represented, and the point *e* thereof is slightly bent inward to facilitate the release of the latch when striking it on closing the door. The arm C has the peculiar bent form, as shown, in order that when the latch meets it, while the door is moving too rapidly, the end of the latch is deflected and strikes the end *e* of the main spring B, thus arresting the motion of the door. When the door is moving at a moderate rate of speed the latch A passes between the end *e* of the main spring B and the arm C without striking the former, the space being just sufficient to allow it to pass by it; but when moving faster, the latch is thrown against the spring, which gently checks the movement of the door and prevents it from slamming.

It may be remarked that the small spring *d* must be very light and flexible to prevent the latch from hugging the bend of the arm C in such a manner as to escape striking the main spring.

Having thus described my invention, I claim—

The bent arm C, in combination with the spring B, and the latch A, and attachments, arranged as described, substantially as and for the purposes hereinbefore set forth.

In testimony that I claim the foregoing improvement I have hereunto set my hand this 16th day of May, 1874.

LEWIS GOODYEAR.

Witnesses:
EGBERT MORE,
F. W. CROCKER.